United States Patent
Thompson et al.

(10) Patent No.: US 10,402,728 B2
(45) Date of Patent: Sep. 3, 2019

(54) SYSTEMS AND METHODS FOR MULTI-OBJECTIVE HEURISTICS WITH CONDITIONAL GENES

(71) Applicant: THE AEROSPACE CORPORATION, El Segundo, CA (US)

(72) Inventors: Timothy Guy Thompson, Purcellville, VA (US); Matthew Phillip Ferringer, Round Hill, VA (US); Ronald Scott Clifton, Leesburg, VA (US); Catherine F. Horan, Clifton, VA (US); Kyle D. Hanifen, Vienna, VA (US)

(73) Assignee: The Aerospace Corporation, El Segundo, CA (US)

( * ) Notice: Subject to any disclaimer, the term of this patent is extended or adjusted under 35 U.S.C. 154(b) by 619 days.

(21) Appl. No.: 15/094,521

(22) Filed: Apr. 8, 2016

(65) Prior Publication Data
US 2017/0293839 A1    Oct. 12, 2017

(51) Int. Cl.
*G06N 3/12* (2006.01)
*G06N 99/00* (2019.01)
(52) U.S. Cl.
CPC ............. *G06N 3/126* (2013.01); *Y04S 10/54* (2013.01)
(58) Field of Classification Search
CPC ........................................... G06N 3/126
USPC ............................................. 706/13
See application file for complete search history.

(56) References Cited

U.S. PATENT DOCUMENTS

| | | |
|---|---|---|
| 5,255,345 A | 10/1993 | Shaefer |
| 5,319,781 A | 6/1994 | Syswerda |
| 5,568,500 A | 10/1996 | Furuya et al. |
| 6,532,076 B1 | 3/2003 | Sidorowich |
| 6,662,167 B1 | 12/2003 | Xiao |
| 6,941,287 B1 | 9/2005 | Vaidyanathan et al. |
| 7,835,929 B2 | 11/2010 | Bennett |
| 7,996,344 B1 | 8/2011 | Goel |
| 8,069,127 B2 | 11/2011 | Taylor et al. |

(Continued)

FOREIGN PATENT DOCUMENTS

WO    WO2010132804 A1    11/2010

OTHER PUBLICATIONS

Abraham, Andrew, "Particle Swarm Optimization of Low-Thrust, Geocentric-to-Halo-Orbit Transfers," May 2014, and Dissertation, Lehigh University, 202 pp.. Thesis.

(Continued)

*Primary Examiner* — Kuen S Lu
(74) *Attorney, Agent, or Firm* — Lee & Hayes, P.C.

(57) ABSTRACT

Systems and methods are provided to engage in multi-objective optimization where there may be potential solutions for evaluation (e.g., chromosomes) that each have one or more conditional genes. The value of each of the conditional genes in each of the chromosomes may be equivalent to one of a plurality of hidden genes in each of the chromosomes. The value of each of the conditional genes may be evaluated prior to determining objective values of each of the chromosomes. The objective values of each of the chromosomes may be used to evaluate the potential solutions embodied in the chromosomes and further drive to more optimized solutions. The use of the conditional genes in the chromosomes may reduce the amount of constraint violation checks that may need to be performed.

20 Claims, 11 Drawing Sheets

(56) References Cited

U.S. PATENT DOCUMENTS

| | | | |
|---|---|---|---|
| 8,255,344 | B2 | 8/2012 | Ferringer et al. |
| 8,255,345 | B2 | 8/2012 | Ferringer et al. |
| 8,285,653 | B2 | 10/2012 | Ferringer et al. |
| 8,433,662 | B2 | 4/2013 | Ferringer et al. |
| 8,494,988 | B2 | 7/2013 | Ferringer et al. |
| 8,498,952 | B2 | 7/2013 | Ferringer et al. |
| 8,504,496 | B2 | 8/2013 | Ferringer et al. |
| 8,560,472 | B2 | 10/2013 | Ferringer et al. |
| 8,862,627 | B2 | 10/2014 | Ferringer et al. |
| 9,189,733 | B2 | 11/2015 | Thompson et al. |
| 9,321,544 | B2 | 4/2016 | Thompson et al. |
| 2002/0013776 | A1* | 1/2002 | Kishi ............... F02D 41/1401 700/47 |
| 2005/0187846 | A1 | 8/2005 | Subbu et al. |
| 2007/0005522 | A1 | 1/2007 | Wren |
| 2008/0010044 | A1 | 1/2008 | Ruetsch |
| 2008/0094250 | A1 | 4/2008 | Myr |
| 2008/0215512 | A1 | 9/2008 | Narzisi et al. |
| 2008/0234944 | A1* | 9/2008 | Schaffer ............ G06K 9/00523 702/19 |
| 2008/0241839 | A1* | 10/2008 | Potkin ................ C12Q 1/6881 435/6.16 |
| 2009/0313191 | A1 | 12/2009 | Yao et al. |
| 2010/0040281 | A1 | 2/2010 | Chen et al. |
| 2010/0046806 | A1* | 2/2010 | Baughman ........... G06F 21/316 382/115 |
| 2010/0292929 | A1 | 11/2010 | Ferringer et al. |
| 2010/0293120 | A1 | 11/2010 | Ferringer et al. |
| 2010/0293122 | A1 | 11/2010 | Ferringer et al. |
| 2010/0293313 | A1* | 11/2010 | Ferringer ............... G06N 3/126 710/110 |
| 2011/0078100 | A1 | 3/2011 | Goel |
| 2011/0231320 | A1 | 9/2011 | Irving |
| 2011/0276527 | A1 | 11/2011 | Pitcher et al. |
| 2012/0029965 | A1 | 2/2012 | Steffen et al. |
| 2012/0063590 | A1 | 3/2012 | Dortschy et al. |
| 2012/0084314 | A1 | 4/2012 | Ferringer et al. |
| 2013/0024395 | A1 | 1/2013 | Clark et al. |
| 2013/0054045 | A1 | 2/2013 | Ramezani et al. |
| 2013/0132042 | A1 | 5/2013 | Chan |
| 2013/0218526 | A1 | 8/2013 | Lev et al. |
| 2014/0278695 | A1 | 9/2014 | Smith et al. |
| 2015/0161629 | A1 | 6/2015 | Verma |
| 2017/0011292 | A1 | 1/2017 | Thompson |
| 2017/0068890 | A1 | 3/2017 | Thompson |
| 2017/0169353 | A1 | 6/2017 | Thompson et al. |
| 2017/0364812 | A1 | 12/2017 | Thompson et al. |
| 2018/0082198 | A1 | 3/2018 | Thompson et al. |
| 2018/0082209 | A1 | 3/2018 | Thompson |

OTHER PUBLICATIONS

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common Environment"; 2000; IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries. psu.edu/lheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi-objective Optimization (Video)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Institiute of Technology; Evolutionary Computation 10(3); pp. 1-21.

Lorenz, Edward, "Predictability: A Problem Partly Solved," 1996, In Proc. Seminar on Predictability, vol. 1, No. 1, 18 pages.

Mackey et al, "Oscillation and Chaos in Physiological Control Systems," Jul. 15, 2977, Science. 197(4300): 287-289.

Muhlenbein et al.; "Evolution in time and space—the parallel genetic algorithm.", 1991; Morgan Kaufmann; pp. 1-22.

Office Action for U.S. Appl. No. 13/837,782, dated Jan. 15, 2015, Smith et al., "Systems and Methods of Prioritizing Funding of Projects", 21 pages.

Office Action for U.S. Appl. No. 13/837,782, dated Oct. 20, 2016, Smith et al., "Systems and Methods for Prioritizing Funding of Projects", 16 pages.

Office Action for U.S. Appl. No. 13/837,782, dated Mar. 30, 2017, Smith et al., "Systems and Methods for Prioritizing Funding of Projects", 20 pages.

Office Action for U.S. Appl. No. 13/837,782, dated Apr. 7, 2016, Smith et al., "Systems and Methods for Prioritizing Funding of Projects", 14 pages.

(56) References Cited

OTHER PUBLICATIONS

Office action for U.S. Appl. No. 14/796,299, dated Jun. 19, 2018, Thompson, "Systems and Methods for Multi-Objective Evolutionary Algorithms with Category Discovery", 22 pages.
Office action for U.S. Appl. No. 14/847,424, dated Jun. 28, 2018, Thompson, "Systems and Methods for Multi-Objective Optimizations with Live Updates", 24 pages.
Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Srinivas et al., "Multiobjective Optimization Using Nondominated Sorting in Genetic Algorithms," 1994. Evolutionary Computation, 2(3): 221-248.
Stodgell et al., "Satellite Rendezvous Tours Using Multiobjective Evolutionary Optimization." Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.
Subbu, et. al., "Management of Complex Dynamic Systems based on Model-Predictive Mutli-objective Optimization", IEEE International Conference on Computational Intelligence for Measurement Systems and Applications, Jul. 2006, pages.
Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Tang, Yong, "Advancing Hydrologic Model Evaluation and Identification Using Multiobjective Calibration Sensitivity Analysis and Parallel Computation." ProQuest Information and Learning Company. 2007, 48 pages.
Tang et al., "Parallelization Strategies for Rapid and Robust Evolutionary Multiobjective Optimization in Water Resources Applications." Advances in Water Resources. 2006, 1-39.
Van Veldhuizen et al., "Considerations in Engineering Parallel Multiobjective Evolutionary Algorithms." IEEE Transactions on Evolutionary Computation. vol. 7, No. 2, Apr. 2003. 144-173.
Van Veldhuizen et al., "(Final Draft) TR-98-03 Multiobjective Evolutionary Algorithm Research: A History and Analysis" Oct. 14, 1998; pp. 1-30.
Ventura et al.; "JCLEC: a Java framework for evolutionary computation"; 2007; Springer-Verlag; pp. 381-392.
Zimmer et al., "Utilizing Evolutionary Algorithms for Problems with Vast Infeasible Regions and Expensive Function Evaluations." The Aerospace Corporation. Jun. 27, 2008, 12 pages.
Office Action for U.S. Appl. No. 14/796,299 dated Jan. 23, 2019, Thompson et al., "Systems and Methods for Multi-Objective Evolutionary Algorithms with Category Discovery," 15 pages.
Office Action for U.S. Appl. No. 14/963,870, dated Oct. 3, 2018, Thompson et al, "Systems and Methods for Multi-Objective Evolutionary Algorithms with Soft Constraints", 28 pages.
Kukkonen et al, "Ranking-Dominance and Many-Objective Optimization," Sep. 25, 2007, IEEE Congress on Evolutionary Computation, pp. 3983-3990.
Office Action for U.S. Appl. No. 15/267,528, dated Apr. 16, 2019, Timothy Guy Thompson,"Systems and Methods for Multi-Objective Optimizations with Objective Space Mapping," 25 pages.
Office Action for U.S. Appl. No. 14/847,424, dated Apr. 19, 2019, Timothy Guy Thompson, "Systems and Methods for Multi-Objective Optimizations with Live Updates," 19 pages.
Patel et al., "Fast Mesh-Sorting in Multi-objective Optimization," 2015, Int'l Federation of Automatic Control (IFAC—PapersOnLine) 48(8), pp. 936-941.
Sorensen, "Route stability in vehicle routing decisions: a bi-objective approach using metaheuristics," Central European Journal of Operations Research, 2006, pp. 193-207.
Chootinan et al, "Constraint Handling in Genetic Algorithms Using a Gradient-Based Repair Method," Mar. 14, 2005, Computers & Operations Research, 33: 2263-2281.
Dauphin et al, "Identifying and Attacking the Saddle Point Problem in High-Diminesional Non-Convex Optimization," 2014, In Advances in Neural Information Processing Systems, vol. 27, 9 pages.
Farmani et al, "Self-Adaptive Fitness Formulation for Constrained Optimization", Oct. 2003, IEEE Transactions on Evolutionary Computation, 7(5):445-455.
Ishibuchi et al, "A Multi-Objective Genetic Local Search Algorithm and Its Application to Flowshop Scheduling," Aug. 1998, IEEE Transactions on Systems, Man, and Cybernetics—Part C: Applications and Reviews, 28(3): 392-403.
Office Action dated Apr. 26, 2019 for U.S. Appl. No. 15/268,840 "Systems and Methods for Multi-Objective Optimizations with Decision Variable Perturbations" Thompson, 23 pages.

\* cited by examiner

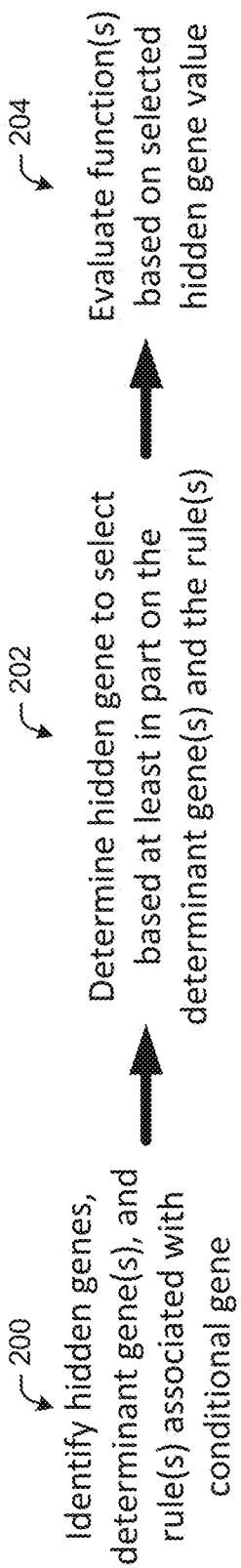

200 — Identify hidden genes, determinant gene(s), and rule(s) associated with conditional gene 202 — Determine hidden gene to select based at least in part on the determinant gene(s) and the rule(s)

204 — Evaluate function(s) based on selected hidden gene value

FIG. 2A

| Gene | Search Band | Conditional Search Band | Meaning/Units |
|---|---|---|---|
| Channel Band (CB) (integer) | [0,3] | N/A | 0=X-band<br>1=Ku-band<br>2=Ka-band<br>3=EHF |
| Channel Frequency (CF) (floating point) | N/A | If CB=0, then [0.05, 0.8]<br>If CB=1, then [0.05, 1.4]<br>If CB=2, then [0.05, 2.9]<br>If CB=3, then [0.05, 4.5] | GHz |

FIG. 2B

| Gene | Search Band | Conditional Search Band | Meaning/Units |
|---|---|---|---|
| Coach Ticket (CT) (floating point) | [100, 900] | N/A | $ |
| Business Class Ticket (BCT) (floating point) | N/A | If CT=[100, 300], then [500, 700]<br>If CT=[301, 500], then [701, 1000]<br>If CT=[501, 900], then [1001, 1500] | $ |
| First Class Ticket (FCT) (floating point) | N/A | If CT=[100, 300], then [800, 1100]<br>If CT=[301, 500], then [1101, 1600]<br>If CT=[501, 900], then [1601, 1900] | $ |

FIG. 2C

| Gene | Search Band | Conditional Search Band | Meaning/Units |
|---|---|---|---|
| Metal 1 Type (M1) (integer) | [0, 2] | N/A | 0=Aluminum<br>1=Copper<br>2=Tungsten |
| Anneal Ambient (A) | [0, 1] | N/A | 0=Ar/N₂<br>1=Forming Gas |
| Anneal Temperature (T) | N/A | If M1=0 and A=0, then [250,400]<br>If M1=0 and A=1, then [250,400]<br>If M1=1 and A=0, then [600, 800]<br>If M1=1 and A=1, then [600, 800]<br>If M1=2 and A=0, then [800, 1400]<br>If M1=2 and A=1, then [800, 1400] | Degrees C |

FIG. 2D

| Gene | Search Band | Conditional Search Band | Meaning/Units |
|---|---|---|---|
| Flight from Chicago to Atlanta (integer) (ORD-ATL) | [0, 2] | N/A | 0=12 PM<br>1=1 PM<br>2=2 PM |
| Flight from Atlanta to Washington, DC (integer) (ATL-IAD) | N/A | If ORD-ATL=0, then [0, 1]<br>If ORD-ATL=1, then [1, 2]<br>If ORD-ATL=2, then [2, 3] | 0=3 PM<br>1=4 PM<br>2=5 PM<br>3=6 PM |
| Flight from Washington, DC to Los Angeles (integer) (IAD-LAX) | N/A | If ATL-IAD=0, then [0, 1]<br>If ATL-IAD=1, then [1, 2]<br>If ATL-IAD=2, then [2, 3]<br>If ATL-IAD=3, then [2, 4] | 0=6 PM<br>1=7 PM<br>2=8 PM<br>3=9 PM<br>4=10 PM |

FIG. 2E

```
                            ← 700
        GENES (
          NAME  comm_chromosome;

GENE_INT (
            TAG newSystemBand;
            INDEX ASSIGN;
            LIMITS (0, 3);
            );

GENE_DOU(
            TAG newSystemBandW;
            INDEX ASSIGN;
            LIMITS CONDITIONAL=condiOnBand;
          );
        );
```

```
                                                                      ← 710
CONDITIONAL (
  NAME condiOnBand;

SUB_LIMITS (0.05, 0.8), (PARENT GENE_TAG=newSystemBand ,RANGE = (0,0);); #K-band   (GHz)
   SUB_LIMITS (0.05, 1.4), (PARENT GENE_TAG=newSystemBand ,RANGE = (1,1);); #KU-band  (GHz)
   SUB_LIMITS (0.05, 2.9), (PARENT GENE_TAG=newSystemBand ,RANGE = (2,2);); #KA-band  (GHz)
   SUB_LIMITS (0.05, 4.5), (PARENT GENE_TAG=newSystemBand ,RANGE = (3,3);); #EHF-band (GHz)

CATCH_ALL_LIMITS  (0.05, 0.8);
);
```

FIG. 7

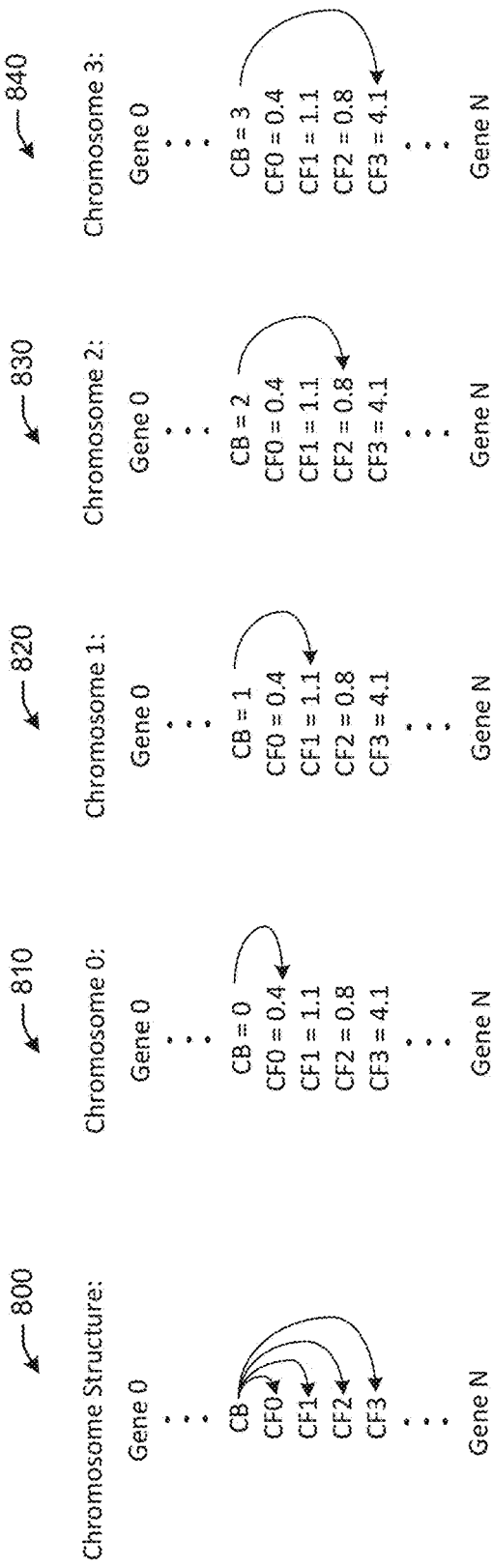

SYSTEMS AND METHODS FOR MULTI-OBJECTIVE HEURISTICS WITH CONDITIONAL GENES

FIELD OF THE DISCLOSURE

Aspects of the disclosure are related generally to multi-objective heuristics, and more particularly to systems and methods that use conditional genes in multi-objective heuristic algorithms.

BACKGROUND OF THE DISCLOSURE

Large-scale value-based non-linear models often require large numbers of decision variables and constraints (e.g., over a million). Heuristic algorithms, such as Multi-objective Evolutionary Algorithms (MOEAs), may fail when they have such a large number of decision variables and constraints. Often times in these MOEAs, the computational bandwidth needed to evaluate whether a potential solution violates a constraint may be relatively high. In some cases, determining whether potential solutions violate constraints may require similar or even more computational bandwidth than evaluations of potential solutions on the basis of one or more objectives.

BRIEF DESCRIPTION OF THE DRAWINGS

Reference will now be made to the accompanying drawings, which are not necessarily drawn to scale, and wherein:

FIG. 2A is a flow diagram that illustrates an example method of determining a value of a conditional gene by selecting a hidden gene, in accordance with example embodiments of the disclosure.

FIG. 2B is a table that illustrates a conditional gene that depends on an independent gene, in accordance with example embodiments of the disclosure.

FIG. 2C is a table that illustrates a two different conditional genes that depends on a single independent gene, in accordance with example embodiments of the disclosure.

FIG. 2D is a table that illustrates a conditional gene that depends on two different independent genes, in accordance with example embodiments of the disclosure.

FIG. 2E is a table that illustrates a conditional gene that depend on an independent gene and a nested conditional gene that depends on the conditional gene, in accordance with example embodiments of the disclosure.

FIG. 7 is a listing that illustrates an example input file defining a conditional gene and hidden associated with the conditional gene, in accordance with example embodiments of the disclosure.

FIGS. 8A-8E are diagrams that illustrate hidden gene selection corresponding to rules associated with a conditional gene, in accordance with example embodiments of the disclosure.

DETAILED DESCRIPTION

Figure 1:
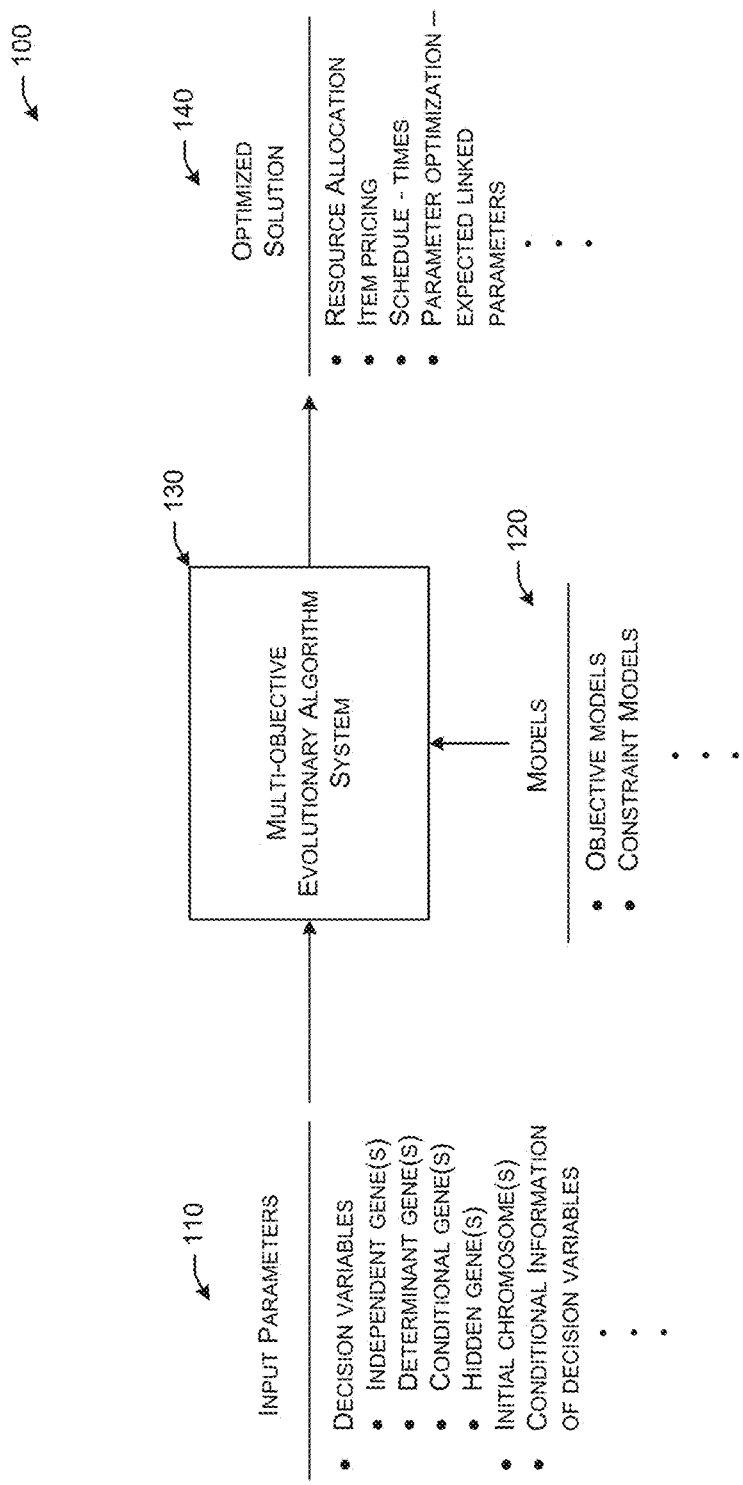
FIG. 1 is a schematic diagram that illustrates an example environment with input parameters and optimized solutions based on one or more objective models and/or constraint models of a multi-objective heuristic system in the form of an evolutionary algorithm (MOEA) system using conditional genes, in accordance with example embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a multi-objective optimization using heuristic algorithms, such as by using multi-objective evolutionary algorithms (MOEAs). Evolutionary algorithms have been described in a variety of other publications including commonly owned U.S. Pat. No. 8,494,988, filed on May 12, 2010 and titled "Systems and Methods for Generating Feasible Solutions from Two Parents for an Evolutionary Process", the contents of which, in its entirety, is incorporated herein by reference.

In example embodiments, there may be a heuristic system, such as a multi-objective evolutionary algorithm (MOEA) system that generates and evaluates solutions (e.g., solutions that are organized a data array or chromosome), where each of the chromosomes may have a plurality of decision variables, or genes. The evaluations of the chromosomes may be based, at least in part, on a number of objectives, or goals. The objectives (e.g., multiple objectives) may be defined for the particular optimization (e.g., process optimization, asset/resource allocation optimization, timing optimization, financial optimization, etc.) and may be evaluated according to one or more objective models (e.g., objective functions corresponding to each objective of the optimization). A potential solution, or chromosome, being evaluated by the MOEA system may be applied to the various objective functions corresponding to each of the objectives of the multiple objective optimization problem to determine an objective value corresponding to each of the objectives for the chromosome. These objective values corresponding to the chromosome may be compared to objective values corresponding to other chromosomes to evaluate the relative performance of a plurality of chromosomes according to the various objectives of the optimization problem.

According to example embodiments of the disclosure, there may be chromosomes that have conditional genes, or genes where the value of that conditional gene, such as for the purpose of function evaluation (e.g., objective value function or constraint value functions), may depend on one or more other genes of the chromosome. In some example embodiments, the value of the conditional gene may be equal to the value of a hidden gene selected from among a plurality of hidden genes associated with the conditional gene. The hidden genes may be part of the chromosome to which the conditional gene exists. The various hidden genes of a chromosome may be subject to a variety of genetic or evolutionary operations for the purposes of generating offspring, or otherwise derivative, chromosome. Based at least in part on a set of rules associated with each set of hidden genes (e.g., the hidden genes corresponding to a particular conditional gene) of a chromosome, one hidden gene from each set of hidden genes may be selected for the purposes of function evaluation, such as objective value or constraint value evaluation. In example embodiments, the rules may be a set of logic rules (e.g., a Boolean algebraic expression) that may use one or more determinant genes to determine which hidden gene to select for each conditional gene of the chromosome. In some cases, the logic rules may be used in conjunction with a function performed on one or more of the determinant genes. In some example embodiments, there may be more than one conditional gene in a chromosome, where each of the conditional genes may have any number of its own hidden genes and selection rules associated with it.

As a non-limiting example, a particular conditional gene may have two different hidden genes associated with it. Furthermore, there may be a rule that if a particular determinant gene has a value in a first range, then the first hidden gene is to be selected, and if the particular determinant gene has a value in a second range, not overlapping with the first range, then the second hidden gene is to be selected. As a result, one of the first hidden gene or the second hidden gene may be selected as the value of the particular conditional gene, based at least in part on the particular determinant gene. Although this example involves two hidden genes, it will be appreciated that there may be any number of hidden genes associated with the conditional gene. Also, although in this example the particular conditional gene's value for the purpose of function evaluation depends on a single determinant gene, in other examples, the conditional gene may depend on any number of determinant genes. The determinant gene(s) may include any number of independent gene(s) (e.g., gene(s) that do not vary based upon other gene(s)) and/or any number of other conditional genes (e.g., as a tiered conditional gene). Further still, it will be appreciated that there may be none or any number of different conditional genes in addition to the particular conditional gene in a chromosome.

In example embodiments, function evaluation, such as any number of objective function evaluations and/or constraint function evaluations, may be performed on chromosomes that may be evaluated as solutions to the multi-objective optimization. Prior to the function evaluation for each of the chromosomes, each of the conditional gene values may be determined by selecting the appropriate hidden gene, based at least in part on one or more independent gene(s) and/or other conditional gene(s), for each of the chromosomes for which function evaluations are to be performed.

The conditional gene may, in example embodiments, be a virtual gene or meta-gene of a data construct. In other words, the conditional gene may not be an actual data element within the chromosome. Instead, the conditional gene may be an indicator of another gene, such as an indicator of one of a plurality of hidden genes associated with the conditional gene. Thus, the conditional gene may be a pointer to another gene (e.g., a hidden gene) and the indicated other gene may be used for the purposes of function evaluation involving the conditional gene. In example embodiments, the conditional gene may be a virtual redirection of the data (e.g., gene) that is used for function evaluation.

It will be appreciated that in accordance with the disclosure herein, the use of conditional genes, with the associated hidden genes, in the MOEA may increase the number of overall genes to be evaluated and subjected to the evolutionary operators (selection, cross-over, mutation, etc.). While on the surface it may seem that there may be added computational bandwidth required in handling additional genes (e.g., hidden genes associated with conditional genes) and identifying final values of conditional genes in each of the chromosomes prior to function evaluation, there may actually be a reduction in the required computational bandwidth. This may be because the use of conditional genes may reduce the number of constraint violations of chromosomes that are subjected to constraint models and constraint functions. In other words, by using conditional genes in a MOEA optimization, as disclosed herein, there may be a reduction in the number of constraints that are violated when chromosomes are evaluated for constraint violations. As a result, a greater proportion of chromosomes, as generated, may be feasible and evaluated based on their objective values, as determined during function evaluation.

It should further be noted that without the use of the conditional genes, as disclosed herein, there may be a greater number of constraint violation checks. By disallowing certain constraint violations by the use of conditional genes, fewer constraint violations may be checked when a chromosome is being evaluated for constraint violations.

As an illustrative example of the concept of reduced constraint violation checks, consider that in a chromosome there is a first gene that is independent and can have a value of 0 or 1 (e.g., a binary independent gene). Consider further that in the chromosome there is second gene that is conditional and can be in the range of between 0 and 10 if the first gene has a value of 0 and in the range between 10.01 and 20 if the first gene has a value of 1. In this case, there may be two hidden genes in the chromosome, where the first hidden gene may have a value between 0 and 10 and the second hidden gene may have a value between 10.01 and 20. Thus during any type evolutionary operation (e.g., cross-over, mutation, etc.) the two hidden genes associated with the second gene (e.g., the conditional gene) must remain within the stipulated ranges. During function evaluation, a rule, such as in the form of metadata associated with the chromosome, may be accessed and/or identified. The rule may provide a mapping between the first gene and each of the hidden genes associated with the conditional gene. Thus, if the first gene has a value of 0, then the first hidden gene, with a value in the range of 0 and 10, may be selected as the value of the conditional gene. On the other hand, if the first gene has a value of 1, then the second hidden gene, with a value in the range of 10.01 and 20, may be selected as the value of the conditional gene. In this case, no constraint violations arise from an inconsistency between the first gene and the second gene (e.g., conditional gene).

For illustrative purposes, consider the alternative to the example above. Suppose the first gene is still an independent gene with a binary state. Suppose now that the second gene is independent, rather than conditional in nature, as is the case in the example above. The second gene may have a total range of values between 0 and 20. However, with this optimization problem, there must be a constraint violation check to make sure that the first gene value and the second gene value are compatible. This constraint violation check may indicate a constraint violation (e.g., infeasibility of the chromosome) if the first gene has a value of 0 and the second gene has any value in the range of 10.01 and 20. Similarly, the constraint violation check may indicate a constraint violation (e.g., infeasibility of the chromosome) if the first gene has a value of 1 and the second gene has any value in the range of 0 and 10. Thus, it can be seen that while in the above example with the second gene as a conditional gene, there may be additional genes, such as the two hidden genes that may be part of the chromosome and subject to genetic/evolutionary operations, there is also a smaller number of constraint checks and a smaller number of chromosomes for evaluation are likely to be found to be infeasible.

Once an unconstrained potential solution (e.g., chromosome) is generated the objective values associated with the potential solution may be determined by the systems and methods, as disclosed herein. The conditional gene value of each of the conditional genes of the chromosome may be determined (e.g., a hidden gene may be selected from among a plurality of hidden genes associated with each of the conditional genes of the chromosome. Once all of the conditional gene values are determined, and it is determined that the chromosome is feasible, then the chromosome may be applied to the objective functions to generate objective values corresponding to each objective used to evaluate solutions and the chromosome. These objective values may then be used, in example embodiments, for evaluating the chromosome as a potential optimized solution to the multi-objective optimization problem.

In example embodiments, the MOEA system may be a system with one or more master processors and one or more slave processors. The chromosomes for which objective values are to be generated may be received by a slave processor from a master processor. The chromosome having one or more conditional genes, in example embodiments, may be generated by the master processor, such as by any suitable mechanism, including, but not limited to selection, cross-over, mutation, cloning, injection, combinations thereof, or the like. Each of the aforementioned processes (e.g., genetic/evolutionary processes) may include one or more sub-processes, such as non-domination sorting and/or tournament selection.

The chromosome having one or more conditional genes, after generation at the master processor, may be passed to a slave processor for the purposes of feasibility checking (e.g., checking for constraint violations) and function evaluations (e.g., objective function value determination according to objective models corresponding to each or a subset of the multiple objectives of the multi-objective optimization). The rules and/or determinant genes (e.g., independent gene(s) or conditional gene(s), in the case of nested conditionality) may be specified for the chromosome. In some cases, the rules and/or determinant genes may be specified as metadata associated with the chromosome being passed to the slave processor. As discussed above, this process of function evaluation at the slave processor may first entail identifying the values, as provided in a hidden gene, of each of the conditional genes of the chromosome. After identifying the values of each of the conditional genes, the feasibility of the chromosome may be determined. Furthermore, the objective values associated with the chromosome may be determined, where one or more of the objective values, as determined based at least in part on the objective functions, may further be based on values of the conditional gene(s) of the chromosome. After determining the objective values of the chromosome, the objective values may be passed back, by the slave processor, to the master processor. In some example embodiments, the objective values may be referenced by an identifier of the chromosome with which it is associated. Alternatively, other mechanisms may be used for indicating and/or identifying an association of a particular set of objective values with its corresponding chromosome.

The chromosome objective values, when received by the master processor from the slave processor, may be used for evaluation the potential solution encoded in the chromosome. In example embodiments, the set of objective values of the chromosome may be compared to other sets of objective values for other chromosomes. In this comparison, a tournament style competition may be performed to identify chromosomes that may be non-dominated by other chromosomes. Non-dominated solutions are those solutions that are better than any previous solution with regards to at least one objective and no worse with regards to all objectives. In other words, chromosomes that may be no worse than other chromosomes or may advance a pareto-front towards a more optimized solution may be selected for propagation to future generations and for spawning child chromosomes that may be similarly evaluated according to objective value performance in future generations of the multi-objective optimization process, or alternatively, as a final optimized solution.

Indeed, the objectives may include any suitable objective, as determined by any suitable objective models and/or objective functions. The objective optimization engine may generate one or more potential solutions (e.g., solutions that advance the pareto-front in the context of the multiple objectives) that may again be provided to the constraint optimization engine for the purpose of constraint optimization. In this way, potential solutions may be passed back and forth between the objective optimization engine and the constraint optimization engine to optimize potential solutions both from a constraint standpoint and an objective standpoint. According to example embodiments of the disclosure, systems and methods may restrict a conditional gene's search range based at least in part on the value of one or more other gene(s) (e.g., determinant gene(s)).

It will be appreciated that the systems and methods, as disclosed herein, may be particularly suited for multi-objective optimization problems using heuristic processes where there is a relatively high degree of infeasibility in the decision variable (e.g., gene) space. In other words, the mechanisms of a priori constraint violation avoidance in potential solutions (e.g., chromosomes), rather than performing a relatively large number of constraint violation checks, may be particularly well suited for optimization problems where there may be relatively large seas of infeasibility with relatively small islands of feasibility in a multi/hyper-dimensional sense. Thus it is submitted that even though there may be additional computational bandwidth expended on performing genetic/evolutionary processes on potentially a relatively non-negligible set of hidden genes associated with conditional gene(s), there may be a net benefit in not having to do as many constraint violation checks and/or by having to discard as many potential solutions due to infeasibility.

It should be noted that the multi-objective problem may be any suitable multi-objective problem. In example embodiments, the methods and systems, as described herein, may be suited for solving pricing optimization problems. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In example embodiments, the systems and methods, as described herein, may be particularly suited for solving relatively highly-constrained multi-objective pricing optimization problems.

In other example embodiments, the methods and systems, as described herein, may be suited for scheduling problems. For example, scheduling problems may include flight sortie scheduling, train departure scheduling, military troops/equipment movement scheduling, etc. Indeed, it will be appreciated that any type of scheduling problem may be applied to the systems and methods, as described herein. In example embodiments, the systems and methods, as described herein, may be particularly suited for solving relatively highly-constrained multi-objective scheduling optimization problems.

In still other example embodiments, the methods and systems, as described herein, may be suited for multi-parameter optimization. For example, a variety of factory-based manufacturing parameters of various manufacturing equipment may be optimized for any variety of objectives, such as manufacturing yield and/or manufacturing throughput, profit, etc. In example embodiments, the systems and methods, as described herein, may be particularly suited for solving relatively highly-constrained multi-objective manufacturing optimization problems.

In yet other example embodiments, the methods and systems, as described herein, may be suited for resource allocation problems. For example, it may be determined which types and/or frequency of transponders, and a quantity of each type of transponder, to place on a satellite or constellation of satellites to optimize a set of objectives, such as coverage, total bandwidth, uplink/downlink ratio, profitability, cost, combinations thereof, or the like. In example embodiments, the systems and methods, as described herein, may be particularly suited for solving relatively highly-constrained multi-objective resource allocation problems.

It will still further be appreciated that the systems and methods, as described herein, may be configured, in example embodiments, to ascertaining trade-offs in the factor input space of various production and/or services. For example, a consulting firm may apply the methods and systems described herein to identify if the types and volumes of consultancy services that may be offered to optimize the level of risk versus profit that may be assumed by the firm. In another example, a company may use the methods and systems, as described herein, to determine how many and of what training and experience of employees it should hire to meet one or more of its objectives.

Indeed, in other example embodiments, the optimization problem to which the methods and systems described herein may be applied may be a combination of various elements, such as pricing, timing, or any other suitable parameter input. The system and methods, as disclosed herein, may be applied to any variety of optimization problems, in accordance with embodiments of the disclosure. Although, certain conditions of conditional genes may be discussed throughout this disclosure, it will be appreciated that any suitable set of conditions may be used for the purposes selecting hidden genes associated with a conditional gene. For example, there may be any number of determinant genes, with any number of conditional nesting, which may be used in conjunction with any suitable Boolean expression of those conditional genes for the purposes of determining feasible values of conditional genes. Indeed, in accordance with example embodiments, the Boolean expressions may use any variety and/or combination of Boolean operators (e.g., NOT, AND, NAND, OR, NOR, XOR, etc.) with any suitable level of complexity and any suitable number of hidden genes. For example a particular hidden gene value may be selected for a particular conditional gene based on three different determinant genes: A, B, and C, where gene B is itself a conditional gene, when the following Boolean expression is True: (NOT (A) OR (B)) AND (NOT (B) OR (C)). While in this example genes A, B, and C were themselves binary type genes, it will be appreciated that each of A, B, and C may alternatively represent binary conditions based on any number of suitable genes for the purpose of identifying a hidden gene to be selected from among a plurality of hidden genes associated with a conditional gene. Further still, a function may be performed using one or more determinant gene(s) with each other or, even with data external to the chromosome, and then that function value may be applied to Boolean operations for the purpose of determining a hidden gene to select from a set of hidden genes corresponding to a particular conditional gene.

It should be noted that the systems and methods, as disclosed herein may be applied to existing problems that utilize classical constraint-violation model(s)/equation(s) by reformulating some or all of the classical constrain-violation equation(s) as logical conditions associated with one or more conditional genes. In some example embodiments, this formulation with conditional genes may enable solving (e.g., reaching convergence or a stop criterion) in a shorter period of time. In other example embodiments, new optimized solutions may be found that may have otherwise been out of reach due to relatively highly constraint decision variable space. In still other example embodiments, optimization problems that classically may have been too complicated for search and optimization via a heuristic process (resulting in MOEA failure) may now be solvable using conditional gene problem formulations.

FIG. 1 is a schematic diagram that illustrates example environment 100 with input parameters 110 and optimized solutions 140 based on one or more objective models and/or constraint models 120 of a multi-objective evolutionary algorithm (MOEA) system 130 using conditional genes, in accordance with embodiments of the disclosure. While a particular configuration of the MOEA system 130 is depicted herein, it will be appreciated that the configuration may vary depending on particular application of the multi-objective MOEA system 130, according to various embodiments of the disclosure. Indeed, there may be any variety of input parameters 110, models 120, system 130, and/or optimized solutions 140.

The input parameters 110 may be any suitable set of parameters, including, in example embodiments, the decision variables (e.g., genes) of the optimization data array (e.g., chromosome). These decision variables or genes may represent all of the variables that are to be optimized in the multi-objective optimization to be performed. The genes may represent parameters that may be set, in a physical sense, based on the multi-objective optimization, to optimize a physical entity (e.g., resource allocation, a set of pricing, production parameters) in accordance with the multiple objectives of the optimization problem. It will be appreciated that according to example embodiments of the disclosure, one or more genes may be conditional genes and that each conditional gene in the chromosome may have two or more hidden genes associated therewith. Each of the conditional genes may have a value (e.g. value equivalent to one of the two or more associated hidden genes) based at least in part on one or more determinant gene(s) (e.g., independent gene(s) or conditional gene(s), in the case of nested conditionality), based on which the value of the conditional gene may be determined for the purpose of function evaluation.

It will be appreciated that the conditional gene may, in example embodiments, be a virtual gene or meta-gene within a chromosome. In some cases, the conditional gene may not be an actual data element or physical gene within the chromosome. The conditional gene, rather, may be a pointer to another gene for the purposes of function evaluation. For example, the conditional gene may indicate which, of a grouping of hidden genes, is to be used for an objective value evaluation. The conditional gene may serve, on one hand, as an indicator of a variable gene selection for function evaluation, and on the other hand a mapping between determinant gene(s) and the hidden genes in accordance with the rules. The function evaluation process may identify that a conditional gene, although a virtual gene, is to first be valuated according to determinant gene(s), hidden genes, and the rule(s), prior to performing the function evaluation.

As an example of the input parameters 110 representing the genes, in the context of a multi-objective optimization of pricing hotel rooms, such as to optimize occupancy, profit, etc., each of the genes may represent different types of hotel rooms that may be offered for rental. Each of the genes may have a descriptor relating to the physical element being optimized. These descriptors may be any variety of naming of the item or any type of parameters that may indicate any quality or naming of the items. For example, in reference to the pricing example of the hotel rooms, the descriptors may include attributes of each type of hotels rooms. Such descriptors may include, for example, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular gene among more than one (e.g., many) genes in a chromosome.

The input parameters 110 may further include initial chromosome(s) or starting points for the optimization process. In some cases the initial chromosome(s) may be one or more currently implemented solutions to the physical manifestation of the optimization problem. For example, in the case of an airline schedule optimization problem, the initial chromosome(s) may include a known current airline schedule that may be used by a particular airline for all of their flights. In some cases, the initial chromosome(s) may represent known feasible solutions, such as based on empirical evidence. In other cases, the initial chromosome(s) may be known to be infeasible (e.g., an airline flight schedule where one or more particular flights never depart on time). In still other cases, the initial chromosome(s) may represent initial best guesses of a solution to the optimization problem, for the purposes of having a starting point.

The input parameters 110 may still further include conditional information associated with conditional genes. This information may be encoded as meta-data associated with the chromosome. The conditional information may be a set of rules for selecting a hidden gene from among all of the hidden genes associated with a particular conditional gene. In example embodiments, these rules may be if/then statements associated with each of the hidden genes of the chromosome. For example, there may be Boolean expressions associated with each of the hidden genes, such that the truth value of the Boolean expressions may be determined to identify the hidden gene that is to be used to valuate a particular conditional gene. All of these rules and conditions may be provided as the input parameters 110 to the MOEA system 130.

The models 120 may include objective model(s) that may be used by the multi-objective optimization engine and constraint models that may be used by the MOEA system 130 to identify constraint violations and the feasibility of chromosomes. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints to which any potential solution may have to comply. For example, with pricing optimization problems, the objective model(s) may be used to evaluate the total number of sales of a particular item at a particular price point.

As shown, the result of optimization based on the input parameters 110 and by using the models 120, outputs 140 may be generated by the multi-objective optimization system 130. The outputs may be one or more variables that are optimized in accordance with the models 120 by the multi-objective optimization system 130. For example, in a pricing optimization problem, the outputs may be an indication of a price or range of prices of various products (e.g., hotel rooms, airline flights, insurance products, investment products, types of mobile electronic devices, etc.) that do not violate any constraints, while providing an optimized solution on the basis of the one or more objective functions.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. In performing this optimization, the chromosomes may contain conditional genes corresponding to the king bed/beach facing room, where the price of that room may be based at least in part on the price of the twin bed/beach facing room. In other words, the twin bed/beach facing room price gene is a determinant gene for the conditional gene of king bed/beach facing room price. This is by way of example only and it will be appreciated that, in example embodiments, there may be more than four items to be priced. For example, a worldwide hotel chain may wish to price its rental rooms across all of its worldwide properties. As another example, an airline may wish to price all flights that it has on its network (e.g., 2000 daily sorties), including multi-leg flights. In such an example, conditional genes may be utilized to implement rules for the relative pricing of various classes (e.g., coach, business, first, etc.) tickets.

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOEA system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

FIG. 2A is a flow diagram that illustrates an example method of determining a value of a conditional gene by selecting a hidden gene, in accordance with example embodiments of the disclosure. At 200, hidden genes, determinant gene(s), and rules associated with a conditional gene(s) may be identified. As described above, the rule(s) may be provided in meta-data associated with each of the chromosomes and/or instructions or conditions provided with the multi-objective optimization to the MOEA system 130. In some example embodiments, the rule(s) may be provided as user input to the MOEA system 130. The user input in some example embodiments, may be an input file that may be used by the MOEA system 130 to receive a variety of input parameters 110. In some cases, the determinant gene(s) may be independent genes (e.g., genes for which their values do not vary based on another gene), conditional gene (e.g., genes for which their values do vary based on another gene), or a combination of independent and conditional genes.

At 202, from among a plurality of hidden genes associated with the conditional gene, one of the hidden genes may be selected based at least in part on the rule(s) and the determinant gene(s). In example embodiments, determinations and/or calculations may be performed to determine which of the hidden gene value is to be selected as being the value of the conditional gene. Each hidden gene may have a condition based at least in part on the determinant gene(s). The truth value of each of the conditions may be determined for each of the hidden gene(s). In example embodiments, the hidden gene with a TRUE truth value according to its condition may be selected as the hidden gene that is to be equated to the conditional gene.

At 204, function(s) may be evaluated based at least in part on the selected hidden gene. These functions, in example embodiments, may be objective value functions that may be evaluated to determine a value corresponding to each of the objectives for which the optimization is performed. These objective values may be used to evaluate each chromosome for the purposes of propagating into a future generation and/or for producing offspring. The objective values of the each of the chromosomes may be compared to the objective values of other chromosomes to determine if the chromosome is non-dominated. In addition to objective value functions, there may be constraint value functions that may be determined to identify if a particular chromosome is feasible. If it is not feasible, then that chromosome, in example embodiments, may not be considered as a potential solution to the multi-objective optimization problem.

FIG. 2B is a table that illustrates a conditional gene that depends on an independent gene, in accordance with example embodiments of the disclosure. The table may relate to a resource allocation optimization. In particular, it may be determined what types of transponders and further what frequency of each transponder may be provided on a satellite or a cluster of satellites. For a particular transponder, there may be an independent gene (CB) that defines the channel band of the transponder. The value of CB may be one of 0, 1, 2, or 3. Each of the values of CB may correspond to a particular band (e.g., 0=X-band, 1=Ku-band, 2=Ka-band, and 3=extreme high frequency (EHF)). For the transponder, there may further be another gene of channel frequency (CF) that may depend on the gene CB. Thus, CB may be a determinant gene for CF. Allowed ranges of the CF for various values of CB are specified in FIG. 2B. For example, the frequency range for X-band may be between 0.05 and 0.8 GHz, for Ku-band may be 0.05 and 1.4 GHz, for the Ka-band may be 0.05 and 2.9 GHz, and for EHF band may be 0.05 and 4.5 GHz.

In the chromosome containing the genes CB and CF, there may be four different hidden genes corresponding to the conditional gene CF. The first hidden gene may have a frequency range corresponding to the allowed frequency range of the X-band. The second hidden gene may have a frequency range corresponding to the allowed frequency range of the Ku-band. The third hidden gene may have a frequency range corresponding to the allowed frequency range of the Ka-band. The fourth hidden gene may have a frequency range corresponding to the allowed frequency range of the EHF band. The four hidden genes may be treated like any other genes for the purposes of performing any variety of suitable genetic operations within the limits of their corresponding allowed values. When a chromosome containing CB and CF is passed from a master processor to a slave processor to perform objective function evaluations and/or feasibility verifications, at first, the value of CF may be determined by identifying the hidden gene of the four hidden genes that is to be selected based at least in part on the value of CB. For example, if the value of CB=0, then the first hidden gene may be selected, if the value of CB=1, then the second hidden gene may be selected, if the value of CB=2, then the third hidden gene may be selected, and if the value of CB=3, then the fourth hidden gene may be selected. After one of the four hidden genes is selected as the value of CF, objective functions may be calculated based at least in part on the determined value of CF. Additionally, a feasibility verification may be performed on the chromosome based at least in part on one or more constraint criteria.

In example embodiments, when the objective values are determined and the chromosome is found to be feasible, the set of objective values may be passed by the slave processor to the master processor, where the set of objective values may be used to compare the chromosome o other chromosomes, such as other chromosomes for which sets of objective values have been determined for the same set of objectives. In example embodiments, the set of objective values may be used for non-domination sorting of a plurality of chromosomes to determine which of the chromosomes, each chromosome representing a potential solution to the optimization problem, are to remain in a population of chromosomes and used to produce derivative chromosomes.

FIG. 2C is a table that illustrates a two different conditional genes that depends on a single independent gene, in accordance with example embodiments of the disclosure. In this case, an airline ticket pricing may be optimized according to any variety of objectives. For example, the objectives may be revenue, profit, load factor, etc. In this non-limiting example, the coach ticket price (CT) may be an independent gene that may take on any value between $100 and $900. Depending on the value of CT, the allowed range of business class ticket prices (BCT) may be set as shown. In this case, there may be three hidden genes associated with the conditional gene BCT. Additionally, allowed range of first class ticket prices (FCT) may also depend on CT as shown. There may be three hidden genes associated with the conditional gene FCT. Thus both the allowed range of BCT and FCT may depend on the value of CT. When objective values of a chromosome having these genes are to be determined, the hidden gene corresponding to BCT and the hidden gene corresponding to FCT may be determined. The rules associated with this chromosome may indicate the ranges of CT that correspond to each set of hidden genes. Therefore, based at least in part on the rules and the determinant gene CT, the hidden gene corresponding to BCT and the hidden gene corresponding to FCT may be selected. It will be noted that the hidden genes for BCT and the hidden genes for FCT may be subject to genetic operators (e.g., cross-over, mutation, etc.) like any other gene with the limits of the range of values of each of the hidden genes as specified in FIG. 2C. Once the values of BCT and FCT are known, objective values for the chromosome may be determined.

FIG. 2D is a table that illustrates a conditional gene that depends on two different independent genes, in accordance with example embodiments of the disclosure. In this example, the optimization may be a manufacturing process, such as a manufacturing process in a semiconductor fabrication facility. The multiple objectives may be any suitable objective, such as any variety of integrated circuit performance metrics, such as interconnect resistance, any variety of reliability metrics, such as thermal cycle failures, and/or any variety of manufacturing metrics, such as manufacturing yield. A first determinant gene may be an independent gene of metal type (M1), there the allowable metal choices may be Al, Cu, or W. There may also be a second determinant gene that is an independent gene of anneal ambient (A). The anneal ambient may take on one of two values: Argon/Nitrogen or Forming Gas (Hydrogen/Nitrogen).

In the chromosome, the allowed ranges of a conditional gene of anneal temperature (T) may be based at least in part on both M1 and A. Based on the values of the two different determinant genes A and M1, there may be six different conditions, corresponding to six different hidden genes, of the conditional gene T. Each of the hidden genes have a Boolean expression as a condition for the selection of that hidden gene as the value of the conditional gene T. For example, the condition for selecting the first hidden gene may be that (M1 is Aluminum) AND (A is Ar/N2). When this Boolean expression is TRUE, the first hidden gene may be selected as the value of the conditional gene T and the other of the hidden genes may not be equated to the value of the conditional gene T. Similarly, each of the other five hidden genes may have their own Boolean expressions with non-overlapping truth tables for the purposes of selecting the hidden gene that complies with the requirements of the multi-objective optimization problem.

It will be appreciated that had there not been a conditional gene with corresponding hidden genes that effectively partition the range of the conditional gene to prevent an implementation that is not allowed by the multi-objective optimization problem, then it may be necessary to force the disallowed regimes by way of constraint models and feasibility checks. Such a traditional mechanism, although processing relatively fewer genes (e.g., without hidden genes), may result in a relatively greater number of constrain checks and relatively greater number and/or percentage of chromosomes being discarded for being infeasible.

FIG. 2E is a table that illustrates a conditional gene that depend on an independent gene and a nested conditional gene that depends on the conditional gene, in accordance with example embodiments of the disclosure. This may be a multi-objective optimization of flight routes of an airline. Objectives of such an optimization may be any suitable objectives, such as profitability, on-time arrival percentage, revenue, passengers carried, equipment utilization, airport congestions, or the like. In this case, the conditions may result from the same equipment (e.g., aircraft) being used for flights between multiple cities. There may be an independent determinant gene (ORD-ATL) representing a departure time of a flight from Chicago to Atlanta. There may further be a conditional determinant gene (ATL-IAD) representing the departure time of flight from Atlanta to Washington, D.C. that depends, in part, on ORD-ATL. There may still further be a conditional gene (IAD-LAX) that represents the departure time of a flight from Washington D.C. to Los Angeles. By having the nested conditional gene (IAD-LAX), it is possible to optimize within a physically possible range without allowing value ranges that are physically impossible (e.g., a departure time that is before the arrival time of the previous flight leg for the same aircraft).

Figure 3:
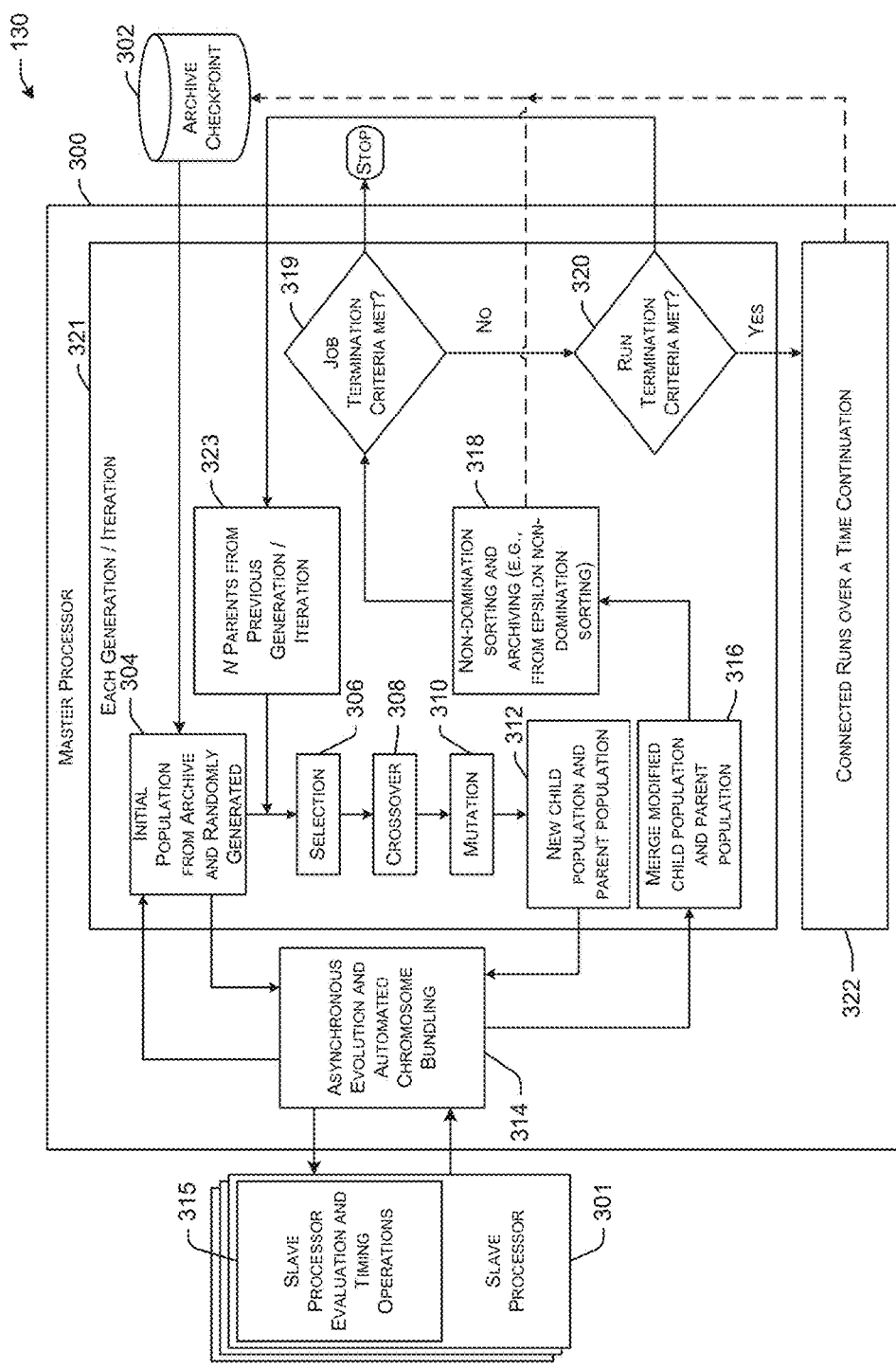
FIG. 3 is a block diagram that illustrates an example objective optimization engine of the example MOEA system using conditional genes of FIG. 1, in accordance with example embodiments of the disclosure.

FIG. 3 is a block diagram that illustrates an example objective optimization engine of the example MOEA system using conditional genes of FIG. 1, in accordance with example embodiments of the disclosure. Evolutionary algorithms and genetic operations are described elsewhere, such as in at least commonly owned U.S. Pat. Nos. 8,255,344 and 8,285,653, both of which are incorporated herein, in their entirety by reference.

The evolutionary algorithm system may employ techniques of biologic natural selection to efficiently search a multi-objective optimization space that may not be amenable to search by analytic, iterative, or other methods. In example embodiments, the search variables, such as the prices of various items in a pricing problem, may be organized as a data structure that resembles genes in a chromosome. In other words, the solution may be represented as a data structure or array of decision variables (e.g., genes). In some example embodiments, the solutions may be organized as chromosomes with genes (e.g., individual decision variables), where the genes may include independent genes and/or conditional genes, where a value of a conditional gene may be based at least in part on one or more determinant gene(s). In example embodiments, the determinant gene(s) may be independent gene(s) or themselves conditional gene(s). When a conditional gene has one or more determinant gene(s) that are conditional gene(s) themselves, then that conditional gene may be referred to as a nested conditional gene. The chromosome may further include hidden genes corresponding to each of the conditional genes. The hidden genes may cover a portion of the range of allowed values of the conditional gene. In this way the allowed values of the conditional genes may be partitioned in a manner where a certain range of allowed values may be selected, by way of selecting the corresponding hidden gene, for the conditional gene based at least in part on the determinant gene(s) and rules associated with the conditional gene.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., transponder configurations of a satellite, prices of items, etc.) from any given generation, based at least in part on the corresponding respective performance on the multiple objectives that are being used to evaluate the optimization problem (e.g., pricing optimization). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes of selecting a relatively optimized solution set (e.g., optimized launch parameters, optimized payload of transponders, optimized pricing, optimized manufacturing parameters, etc.) in accordance with the identified objectives of the optimization. When new child solutions are generated using the biological-styled processes described above, a check for feasibility may be performed.

The parent chromosomes and the child chromosomes may include determinant genes and hidden genes corresponding to conditional chromosomes. The determinant genes and the hidden genes may be subject to the biologic/genetic operators, as described above. The hidden genes as generated in child chromosomes may be subject to the allowable ranges of those hidden chromosomes. In example embodiments, the ranges of allowable values of all of the hidden genes associated with a particular conditional gene may span the full allowable range of the conditional gene, for all conditions of the determinant gene(s).

It can be seen that the mechanisms used by the evolutionary algorithm (e.g., genetic operators, selection, crossover, mutation, etc.), particularly in the form of an evolutionary algorithm system 130, are not mechanisms that are limited to arrive at a convergence in an iterative fashion. Indeed, the mechanism is one that employs intelligent "hopping around" and evaluating according to optimization objectives, rather than a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the evolutionary algorithm system 130, as described herein. Although the multi-objective optimization system 130 is discussed herein in the context of an evolutionary algorithm system, it will be appreciated that the multi-objective optimization system 130 may be any suitable system for implementing a heuristic optimization, such as, but not limited to Monte Carlo methods, extremal optimization (EO) methods, etc.

In this example embodiment, the multi-objective optimization system 130 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein. In some example embodiments, the function evaluation using conditional genes may be implemented on the slave processor(s) 301, while the objective optimization engine may be implemented on the master processor 300.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., an initial set of prices that may be allocated to one or more hotel rooms, an initial allocation of transponders on a constellation of satellites). In other words, the initial population may represent a starting point, such as a best guess or a set of parameters that may represent the current implementation prior to the benefits of the optimization(s), as described herein. The parent chromosomes may have any combination of genes, including, but not limited to, independent genes, determinant genes, conditional genes, and/or hidden genes. In an example embodiment of the disclosure, each parent chromosome data structure (e.g., prices for items in a pricing problem) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm (data types of genes):

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In accordance with example embodiments, the initial population of parent chromosomes may include chromosomes having one or more conditional genes, each conditional gene having two or more hidden genes associated there with and each conditional gene being dependent, at least in part, on one or more determinant genes. In an example embodiment of the disclosure, the initial population of parent chromosome data structures may be obtained from a combination of the archive checkpoint 302 and random generation of new chromosome data structures. The archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system.

The archive checkpoint 302 may include an elite set of chromosome data structures (i.e., elite solutions of transponders to allocate to a satellite) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions. It will be appreciated that the elite chromosomes, as stored in the archive checkpoint 302, may include conditional genes that may be based at least in part on one or more determinant genes and have a plurality of hidden genes associated therewith.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. In example embodiments, the objective functions may use conditional gene values in determining an objective value associated with a particular chromosome. In these cases, a value of the conditional chromosome may be determined prior to performing the objective function evaluation on the chromosome. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Indeed, the structure of the data may remain defined with any new chromosomes. These chromosomes may include hidden genes that have predefined ranges (e.g., a non-overlapping range that spans the full range of the corresponding conditional gene), as well as determinant genes (e.g., independent or conditional determinant genes). Values for the derived variables can be calculated from one or more evolved variables, static variables, and/or other derived variables in accordance with one or more specified functions. The randomly generated parent chromosome data structures may then be delivered to block 314, which allocates the chromosomes to the slave processors 301 for objective function evaluation and/or constraint function evaluation by block 315. Once the objective function evaluations evaluation in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures of launch parameters. In an example embodiment of the disclosure, the selection of the pairs of parent chromosome launch parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 306, the chromosomes in selected pairs of parent chromosome data structures may be subject to one or more evolutionary operators to generate a plurality of child chromosome data structures, according to an example embodiment of the disclosure. It will be appreciated that in accordance with example embodiments of the disclosure, hidden genes that may be associated with one or more conditional genes of the chromosome may be applied to the various evolutionary operators. Two example evolutionary operators are illustrated by blocks 308 and 310. For example, block 308 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

It will further be appreciated that if genes are crossed-over or mutated in blocks 308 and 310, respectively, then the genes must stay within any predetermined bounds of those genes (e.g., values may only be within allowable ranges for all genes that are modified by a genetic operator). This further applies to any hidden gene. If a hidden gene has an allowable range that is a sub-set of the allowable range of its corresponding conditional gene, then after any genetic operations, the hidden gene must be within its allowable range. Indeed, not adhering to the hidden gene's allowable range may result in the corresponding conditional gene not being within control to prevent an infeasible solution, in accordance with example embodiments of the disclosure.

After the evolutionary operations of block 306, 308, and 310, a new population of child chromosome data structures (e.g., transponders allocated to a satellite to be evaluated) may be obtained in block 312. Following block 312, processing may proceed to block 314. In block 314, the new population of child chromosome data structures may be received into a "To Evaluate" list or queue. Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. The example automated chromosome bundling process may allow efficient allocation of chromosome data structures among the plurality of slave processors 301. In some cases, a number of flags, indicating the number of genes that are permitted to be considered as deviating from the baseline solution chromosome, may be considered in the bundling process.

In block 315, each slave processor 301 may have received a chromosome bundle comprising one or more chromosome data structures from the master processor 300. It will be appreciated that the chromosomes in the chromosome bundle may include hidden genes corresponding to one or more conditional genes that may be dependent on one or more determinant genes (e.g., determinant genes that are either independent genes or conditional genes themselves). Additionally, in certain embodiments, the slave processors 301 may further receive a baseline chromosome or solution organized in any manner, representing a known solution. The slave processors 301 may be homogenous or heterogeneous in processing capability. Each slave processor 301, after receiving its chromosome bundle, may determine a value of each of the conditional genes of each of the chromosomes of the bundle of chromosomes. In other words, the slave processor 301 may determine which hidden gene is to be selected based on determinant gene(s) corresponding to each of the conditional genes of each of the chromosomes of the chromosome bundle provided to the slave processor 301.

Each slave processor 301, after determining the value of each of the conditional genes, may evaluate, in accordance with a plurality of objective functions, the received chromosome bundle of chromosome data structures, and/or the baseline solution chromosome to generate a plurality of respective objective function values for each chromosome data structure in block 315. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values) and timing data (e.g., wait times and/or objective function evaluation times) to the master processor 300. It will be appreciated that in example embodiments, the objective values of each of the chromosomes may depend, at least in part, on the value of conditional gene(s) of those chromosomes.

In some of these example embodiments, the slave processors 301 may further provide objective values, as determined using the objective models 120, along with the non-constraint solutions. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In block 316, the master processor 300 may receive a modified child population of chromosome data structures from the asynchronous evolution process of block 314 along with corresponding objective values. The received modified child population is merged with the current parent population, as illustrated by block 316. In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.
Condition 2: The solution $x_1$ is strictly better than $x_2$ in at least one objective.

If both conditions 1 and 2 are satisfied, then all of the following statements are substantially equivalent:
$x_2$ is dominated by $x_1$,
$x_1$ is non-dominated by $x_2$, or
$x_1$ is non-inferior to $x_2$.

Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 302 or another archive of a computer memory or other data storage for subsequent retrieval.

Following processing in block 318, processing may proceed to block 319. In block 319, a determination is made as to whether the current job is completed such that the evolutionary algorithm should be terminated. A job typically comprises processing involving a plurality of connected runs 322, where each run 322 may include processing associated with one or more generations/iterations 321. Block 319 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 319 determines that the job is not complete, then processing may proceed to block 320 to determine whether the current run 322 has completed. In determining whether the current run is complete, block 320 may determine whether a current run 322 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 320 determines that a current run 322 is not complete, then processing may proceed to block 323, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 320 may determine that a current run 322 is complete. For example, looking back over a predetermined number of generations, the search may have failed to produce improvement in the solutions during each generation/iteration 321 of the current run 322. Improvement may be based upon the quantity of the solutions (e.g., the number of solutions) and the quality of the solutions (e.g., some quantification of distance from a utopia point, box fitness, etc.). In this case, the current run 322 may be completed, and processing proceeds to initiate a subsequent run 322. The subsequent run 322 may generate an initial population by invigorating the elite solutions stored in the archive checkpoint 302. In particular, the subsequent run 322 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. In example embodiments, the elite solutions may be non-constraint due to constraint violation checks for solution feasibility at the slave processors 301. In example embodiments, infeasible chromosomes may not be returned by the slave processors 301 to the master processor or returned and tagged as infeasible. These infeasible chromosomes may be culled out of the population, as they represent non-viable solutions. The randomly generated parent chromosome data structures may be generated and evaluated using the example processes discussed with respect to blocks 304 and 314.

In some example embodiments, the processors 300, 301 of the multi-objective optimization system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-objective optimization system 130 may also include a chipset (not shown) for controlling communication between the one or more processors 300, 301 and one or more of the other components of the s multi-objective optimization system 130. The one or more processors 300, 301 may also include one or more application specific integrated circuits (ASICs) or application specific standard products (ASSPs) for handling specific data processing functions or tasks. In example embodiments, the multi-objective optimization system 130 may further include input/output (I/O) device(s) such as display screen(s), touch sensitive display screen(s), speaker(s), haptic device(s), or the like, may be controlled via one or more I/O device interfaces.

The multi-objective optimization system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the multi-objective optimization system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
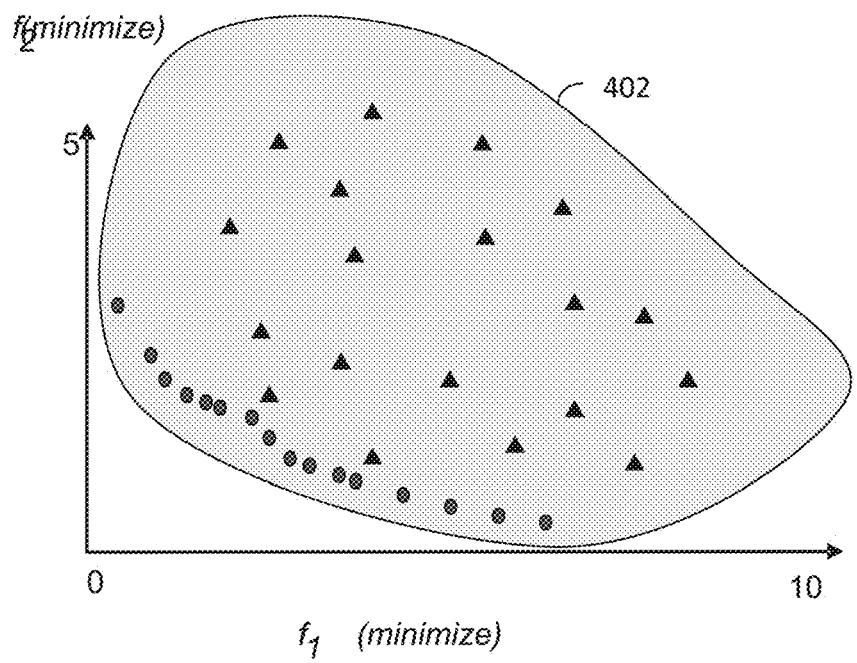
FIGS. 4A and 4B are charts illustrating an example pareto-optimized solution to a multi-objective problem, in accordance with example embodiments of the disclosure.
Figure 4B:
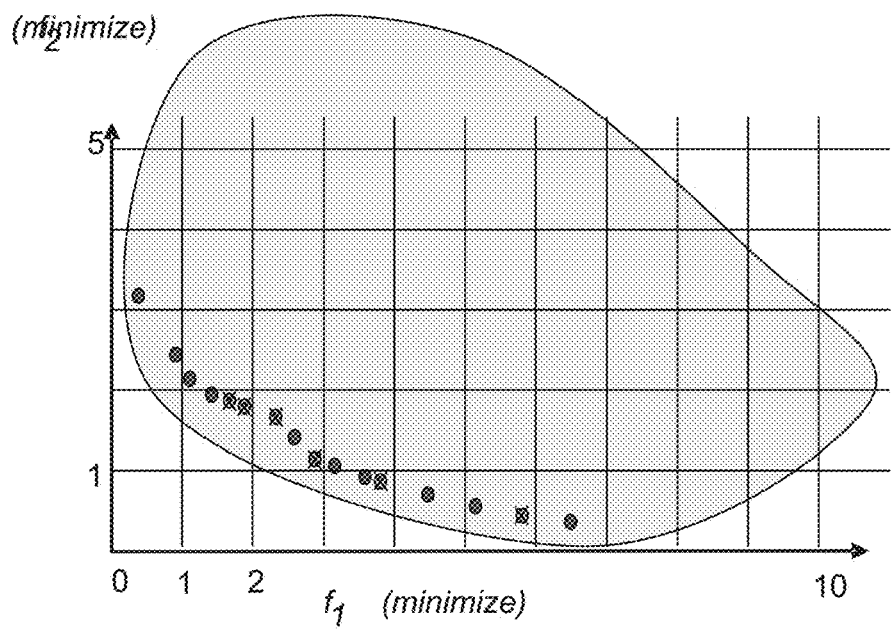

FIGS. 4A and 4B are charts illustrating an example pareto-optimized solution to a multi-objective problem, in accordance with embodiments of the disclosure. Initially, a first non-domination sorting may be applied to the current population 402 to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function $f_1$, and a second epsilon value may be associated with second epsilon spacing or step size $\varepsilon_2$ associated with objective function $f_2$. Each solution may then be associated with an epsilon vector or epsilon box address ($\varepsilon_1$, $\varepsilon_2$) corresponding to the first epsilon value and the second epsilon value. If two or more solutions have the same epsilon box address, then the epsilon non-domination sorting may retain a single solution per epsilon box address ($\varepsilon_1$, $\varepsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region 402 associated with a first objective function $f_1$ and a second objective function $f_2$. Within the feasible design region is a snapshot of a population of solutions of a given generation/iteration, according to an example embodiment of the invention. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 5:
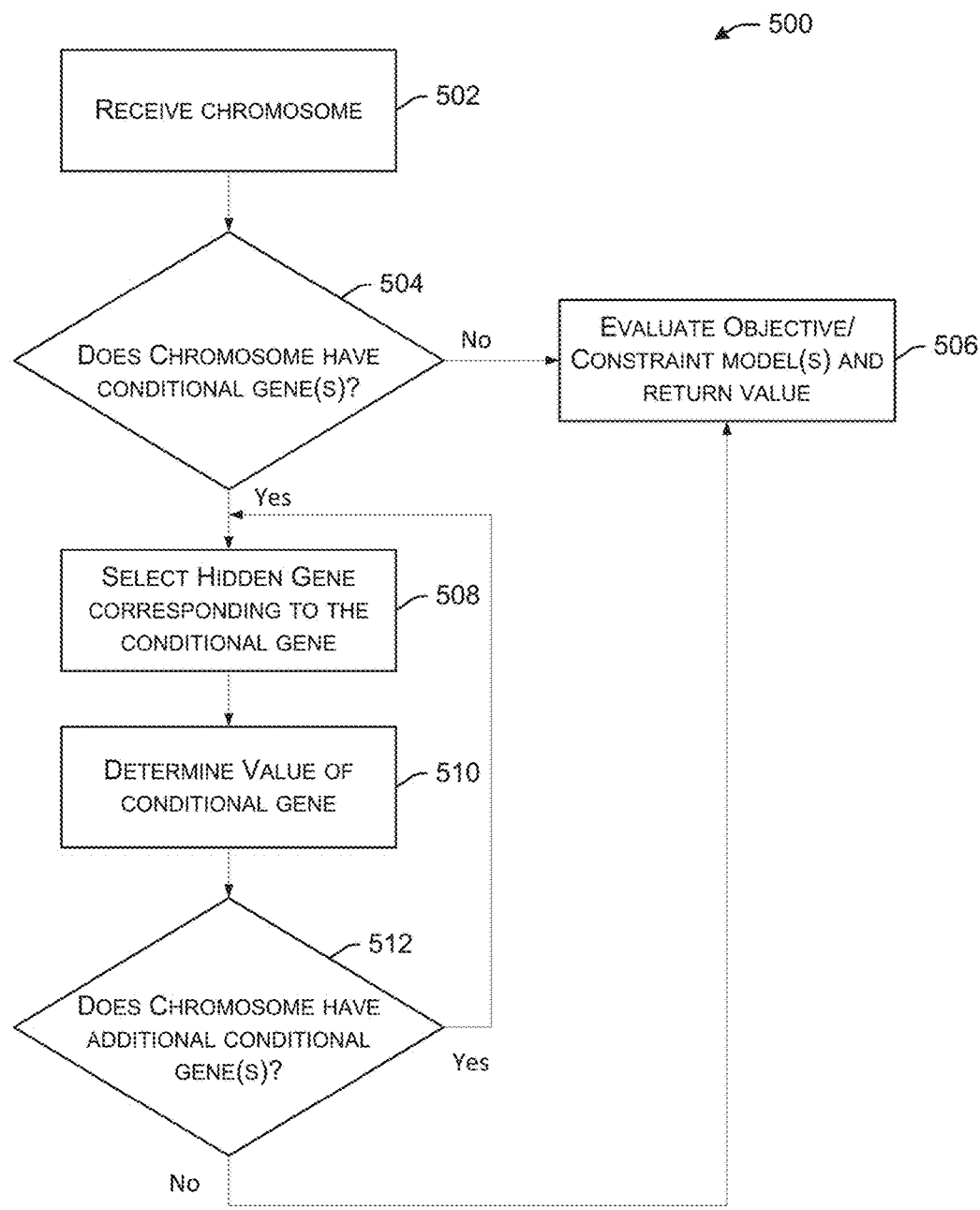
FIG. 5 is a flow diagram that illustrates an example method for performing a function evaluation of a chromosome having conditional genes, in accordance with example embodiments of the disclosure.

FIG. 5 is a flow diagram that illustrates an example method 500 for performing a function evaluation of a chromosome having conditional genes, in accordance with example embodiments of the disclosure. The method 500 may be performed by the MOEA system 130, and in particular, by the one or more slave processor(s) 301. At block 502, a chromosome may be received. This chromosome, in example embodiments, may be received as part of a bundle of chromosomes at block 314 of FIG. 3. The chromosome, according to example embodiments of the disclosure, may include one or more conditional genes, along with a plurality of hidden genes corresponding to each of the conditional genes, and further one or more determinant genes, based upon which the appropriate hidden gene corresponding to each conditional gene is to be selected. In example embodiments, the chromosomes may have rules associated therewith that indicate which hidden gene is to be selected as the value of each of the conditional genes of the chromosome based on the value(s) of the determinant gene(s). In some cases, these rules may be available to the slave processor(s) 301 prior to receiving the chromosome. In other cases, the rules may be appended with the chromosome, such as in the form of metadata.

At block 504, it may be determined if h received chromosome has any conditional gene(s). If it is determined that the chromosome does not have any conditional genes, then the method 500 may proceed to block 506, where the objective values and/or constraint values associated with the chromosome may be determined, such as by applying one or more objective functions corresponding to each of the objectives or by applying one or more constraint functions corresponding to each constraint associated with the multi-objective optimization. In some cases, a chromosome that is infeasible, as determined from the constraint values, may be discarded or indicated to be infeasible. When the objective values associated with the chromosome is determined, the objective values may be provided to the master processor 300. These objective values may be used by the master processor 300 for the purposes of non-domination sorting, such as at block 318 of FIG. 3.

If at block 504 it was determined that the chromosome did have conditional gene(s), then the method 500 may proceed to block 508 where, for a first conditional gene, the hidden gene corresponding to the conditional gene may be selected. This selection may be based at least in part on the rules of selection, in addition to the state and/or value of the determinant gene(s) upon which the value of the conditional gene depends. In example embodiments, the rules may be used to determine any conditions and/or logical evaluations (e.g., Boolean expressions) based on the determinant gene(s) that correspond to the conditional gene being evaluated. The conditions and/or logical evaluations of each of the hidden genes may be performed until a hidden gene is found that fits the conditions and/or logical evaluations. In example embodiments, each of the hidden genes associated with a particular conditional gene may be uniquely mapped. In other words, in these example embodiments, more than one hidden gene per conditional gene may not be selected. Thus, in example embodiments, if the selection of a particular hidden gene corresponding to a particular conditional gene is performed according to the truth value of a particular Boolean expression, then in these example embodiments, only one hidden gene may be "TRUE" for any given state of the determinant genes. The process of block 508 is discussed in further detail in conjunction with FIG. 6 below.

At block 510, the value of the conditional gene may be determined. In example embodiments, the value of the conditional gene may be set to the value of the hidden gene selected in the processes of block 508. At block 512, it may be determined if there are any further conditional genes in the chromosome. If there are additional conditional genes in the chromosome, then the method 500 may return to block 508 to perform a hidden gene selection and valuation process for the next conditional gene in the chromosome. If, however, at block 512 all of the conditional gene(s) of the chromosome have values associated therewith, then the method 500 may proceed to block 506 where the objective and/or constraint values of the chromosome may be determined and returned to the master processor 300 as a bundle of objective values of the chromosome.

It will be appreciated that by having conditional genes where the range of the conditional gene is effectively partitioned in to allowable subsets, according to determinant gene(s) upon which the conditional gene depends, constraint checks and constraint violations arising from incompatibility of the conditional gene value with the determinant gene value(s) may not arise. Accordingly, the multi-objective optimization may be more efficient and may more effectively use computing and/or storage resources for arriving at a multi-objective solution. In some cases, the use of the conditional gene mechanism, as described as method 500, may make finding a multi-objective solution a possibility that had not previously been achievable in some example multi-objective problems.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
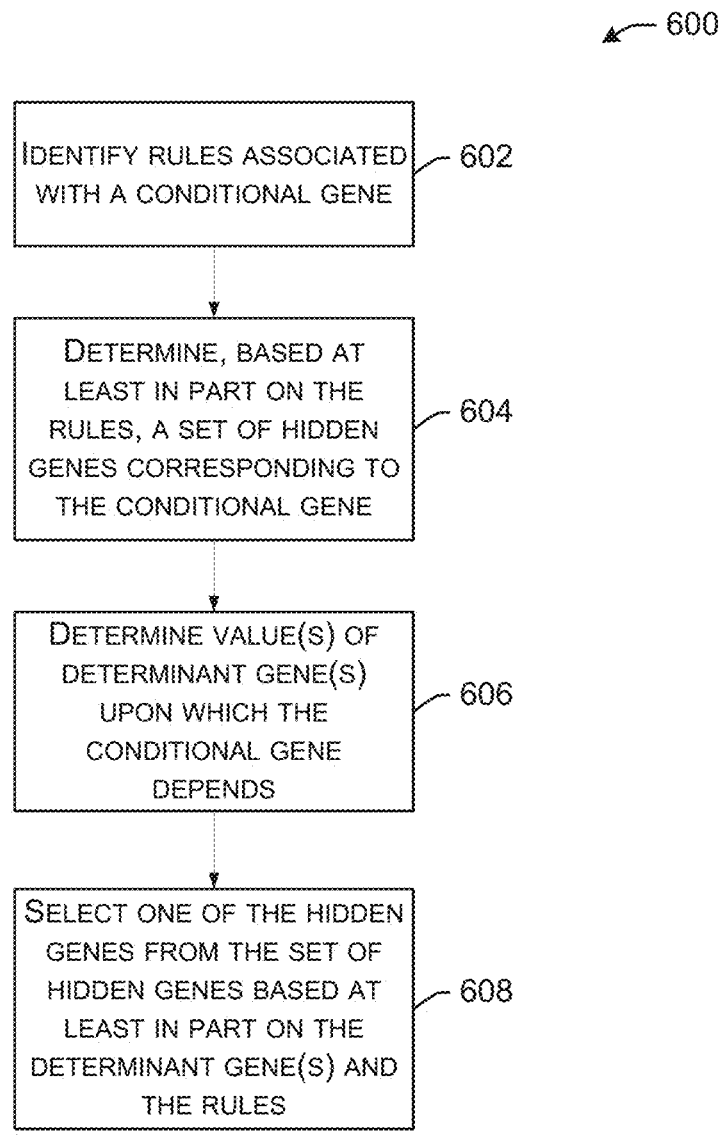
FIG. 6 is a flow diagram that illustrates an example method for determining values of conditional genes of a chromosome for function evaluation, in accordance with example embodiments of the disclosure.

FIG. 6 is a flow diagram that illustrates an example method 600 for determining values of conditional genes of a chromosome for function evaluation, in accordance with example embodiments of the disclosure. The method 600 may be an example implementation of block 508 of method 500 of FIG. 5. In example embodiments, the method 600 may be performed at a slave processor 301 on a chromosome received from a master processor 300.

At block 602, rules associated with the conditional gene may be identified. Based at least in part on a set of rules associated with each set of hidden genes (e.g., the hidden genes corresponding to a particular conditional gene) of a chromosome, one hidden gene from each set of hidden genes may be selected for the purposes of function evaluation, such as objective value or constraint value evaluation. In example embodiments, the rules may be a set of logic rules (e.g., a Boolean algebraic expression) that may use one or more determinant genes to determine which hidden gene to select for each conditional gene of the chromosome. In some example embodiments, there may be more than one conditional gene in a chromosome, where each of the conditional genes may have any number of its own hidden genes and selection rules associated with it. The selection from among hidden genes of each of the conditional gene(s) of the chromosome may depend on any suitable set of conditions and/or determinant gene(s). For example, there may be any number of determinant genes, with any number of conditional nesting, which may be used in conjunction with any suitable Boolean expression of those conditional genes for the purposes of determining feasible values of conditional genes. Indeed, in accordance with example embodiments, the Boolean expressions may use any variety and/or combination of Boolean operators (e.g., NOT, AND, NAND, OR, NOR, XOR, etc.) with any suitable level of complexity and any suitable number of hidden genes. In some example embodiments, the rules associated with conditional gene(s) of a chromosome may be passed to a slave processor 301 from a master processor 300 along with the chromosome. In further example embodiments, the rules may be indicated in metadata of the chromosome received by the slave processor 301. Alternatively, in example embodiments, the rules may be provided to some or each of the processors 300, 301 prior to performing the multi-objective optimization. In some cases, these rules may be developed during a problem formulation phase of the multi-objective optimization.

At block 604, a set of hidden genes corresponding to the conditional gene may be determined based at least in part on the rules. In example embodiments, the rules may indicate the mapping of conditional gene(s) to their respective corresponding hidden genes. It will be appreciated that all of the combined allowable values of the hidden genes corresponding to a conditional gene may span the entire range of allowed values of the underlying conditional gene. In some cases, the allowable values of the hidden genes of a conditional gene may not be overlapping. In other cases, there may be overlaps in the allowable values of the hidden genes of a conditional gene. In example embodiments, the rules may be such that exactly one hidden gene from among a full set of hidden genes corresponding to the conditional gene may be selected for any given value of the underlying determinant gene(s).

At block 606, value(s) of the determinant gene(s) upon which the conditional gene depends. In example embodiments, the determinant gene(s) associated with the conditional gene may be indicated in the rules, as identified in the processes of block 602. In these example embodiments, the dependencies (e.g., determinant gene(s), conditions of determinant gene(s), conditions, as applied to hidden genes, etc.) may be provided by way of the rules. In example embodiments, the value(s) of the determinant gene(s) may be used for the purposes of determining which hidden gene to select as the value of the conditional gene for the purposes of function evaluation.

At block 608, one of the hidden genes may be selected from the set of hidden genes based at least in part on the determinant gene(s) and the rules. The rules, in example embodiments, may provide conditions (e.g., Boolean conditional expressions) associated with each of the hidden genes corresponding to the conditional gene. These conditions may be evaluated to determine a truth value of each of the conditions associated with each of the hidden genes. Based at least in part on the truth values, the appropriate hidden gene may be selected form the set of hidden genes corresponding to the conditional gene. Once the correct hidden gene is selected the conditional gene value may be set equal to the value of the selected hidden gene. This value may now be used by the slave processor 301 for function evaluation, such as objective function evaluation.

As a non-limiting example of the hidden gene selection, consider a set of two hidden genes (e.g., first hidden gene and second hidden gene) for a particular conditional gene based on two different determinant genes: gene A and gene B. Further consider that the range of values of gene A is from 0 to 10 and the range of values for gene B is also from 0 to 10. A condition for selecting the first hidden gene may be ((A<5) OR (B>5)). Thus, if this condition of ((A<5) OR (B>5)) is TRUE, then the first hidden gene may be selected and the value of the conditional gene may be set to the value of the first hidden gene. In this example, a condition for selecting the second hidden gene may be NOT ((A<5) OR (B>5)). Thus, if this condition of NOT ((A<5) OR (B>5)) is TRUE, then the second hidden gene may be selected and the value of the conditional gene may be set to the value of the second hidden gene. It will be appreciated that in this example, the conditional values for selection between the first hidden gene and the second hidden gene are non-overlapping. In other words, there are no value of gene A and/or gene B where the expression ((A<5) OR (B>5)) and NOT ((A<5) OR (B>5)) can be TRUE at the same time or FALSE at the same time. Thus, for any state of gene A and gene B, one and only one, of the hidden genes will be selected. It will be appreciated that the two hidden genes may have at least a portion of their allowable range of values that are non-overlapping.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

FIG. 7 is a listing that illustrates an example input file 700, 710 defining a conditional gene and hidden associated with the conditional gene, in accordance with example embodiments of the disclosure. In example embodiments, the MOEA system may have a text-based application program interface (API). The genes defined here may correspond to the example transponder allocation optimization as described in FIG. 2B. As shown, the gene newSystemBand (corresponding to CB in FIG. 2B) may be an integer type and may take on integer values (e.g., allowable search values) between and including 0 and 3. This newSystemBand gene definition in the input file 700, thus may indicate a name, data type, and allowed range of this gene. The conditional gene in this input file 700 is defined as newSystemBandW (corresponding to CF in FIG. 2B). The data type of this gene is shown as a double precision floating point value. The limits of newSystemBandW is indicated as "condiOnBand," indicating its conditionality based at least in part on the newSystemBand gene (e.g., CB gene). In a conditional input block 710, the conditions (e.g., rules) and the hidden genes (e.g., partitioned ranges) associated with the conditional limit "condiOnBand" is shown. Each of the sub-limits (e.g., portion of the full allowable range of CondiSystemBandW gene) are specified for each of the hidden genes. Each of the four hidden genes have an allowable frequency range that corresponds to each of the transponder bands (e.g., X-band, Ku-band, Ka-band, and EHF). Additionally, the conditions (e.g., rules) under which a particular hidden gene is to be selected is also specified.

FIGS. 8A-8E are diagrams that illustrate hidden gene selection corresponding to rules associated with a conditional gene, in accordance with example embodiments of the disclosure. The chromosome structure 800 is shown in FIG. 8A. In example embodiments, there may be any number of genes (Gene 0 to Gene N), including the channel band (CB) determinant gene, as well as four hidden channel frequency genes (CF0 corresponding to the X-band, CF1 corresponding to the Ku-band, CF2 corresponding to the Ka-band, and CF3 corresponding to the EHF-band. As shown in chromosome 810 of FIG. 8B, when the determinant gene, CB=0, the hidden gene CF0 may be selected, in accordance with the rules depicted in FIG. 2B and FIG. 7, where the allowed range of CF0 corresponds to the frequency range of the X-band. As shown in chromosome 820 of FIG. 8C, when the determinant gene, CB=1, the hidden gene CF1 may be selected, in accordance with the rules depicted in FIG. 2B and FIG. 7, where the allowed range of CF1 corresponds to the frequency range of the Ku-band. As shown in chromosome 830 of FIG. 8D, when the determinant gene, CB=2, the hidden gene CF2 may be selected, in accordance with the rules depicted in FIG. 2B and FIG. 7, where the allowed range of CF2 corresponds to the frequency range of the Ka-band. As shown in chromosome 840 of FIG. 8E, when the determinant gene, CB=3, the hidden gene CF3 may be selected, in accordance with the rules depicted in FIG. 2B and FIG. 7, where the allowed range of CF3 corresponds to the frequency range of the EHF-band. Once the appropriate hidden gene is selected, the value of the conditional gene CF may be assigned to that hidden gene. After the valuation of the conditional gene, objective function values may be determined using the determined value of the conditional gene.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    generating, by a heuristic system comprising one or more processors and based at least in part on a first chromosome and a second chromosome, a third chromosome, wherein the third chromosome comprises a determinant gene and a conditional gene, wherein a value of the conditional gene is based at least in part on a value of the determinant gene;
    identifying, by the heuristic system, a first hidden gene and a second hidden gene corresponding to the conditional gene;
    determining, by the heuristic system and based at least in part on the value of the determinant gene, that the value of the conditional gene is equal to a value of the first hidden gene;
    determining, by the heuristic system and based at least in part on the value of the conditional gene, an objective value corresponding to an objective model;
    determining, by the heuristic system and based at least in part on the objective value, that the third chromosome is non-dominated by a fourth chromosome; and
    providing the third chromosome as a solution to a multi-objective optimization problem.

2. The method of claim 1, further comprising:
    determining, by the heuristic system and based at least in part on the value of the conditional gene, a constraint value corresponding to an objective model; and
    determining, by the heuristic system and based at least in part on the constraint value, that the third chromosome is feasible.

3. The method of claim 1, the objective value is a first objective value, and further comprising:
    determining, by the heuristic system, a second objective value corresponding to the fourth chromosome; and
    comparing, by the heuristic system, the first objective value to the second objective value, wherein determining that the third chromosome is non-dominated by the fourth chromosome is based at least in part on the comparing.

4. The method of claim 1, wherein the conditional gene is a first conditional gene, and wherein generating the third chromosome comprises performing a cross-over function between the first chromosome and the second chromosome, wherein the first chromosome has a third hidden gene and a fourth hidden gene corresponding a second conditional gene, the second conditional gene of the first chromosome corresponding to the first conditional gene of the third chromosome.

5. The method of claim 1, wherein generating the third chromosome comprises performing a mutation function, wherein at least one of the first hidden gene and the second hidden gene is mutated.

6. The method of claim 1, wherein the first hidden gene corresponds to a first range of values of the determinant gene, and wherein the second hidden gene corresponds to a second range of values of the determinant gene.

7. The method of claim 1, wherein the first hidden gene has a first allowable range of values and the second hidden gene has a second allowable range of values, wherein the first allowable range and the second allowable range are at least partially non-overlapping.

8. The method of claim 1, wherein the determinant gene is a first determinant gene, and wherein the first determinant gene has a value equal to one of a value of a third hidden gene or a fourth hidden gene based at least in part on a second determinant gene.

9. The method of claim 1, wherein the conditional gene is a first conditional gene, and wherein the third chromosome has a second conditional gene, a third hidden gene corresponding to the second conditional gene, a fourth hidden gene corresponding to the second conditional gene, and a fifth hidden gene corresponding to the second conditional gene, wherein a value of the second conditional gene is based at least in part on a set of rules and a set of at least one determinant genes.

10. The method of claim 9, wherein the objective value is based at least in part on the second conditional gene.

11. A system, comprising:
    a memory that stores computer-executable instructions;
    at least one processor configured to access the memory, wherein the at least one processor is further configured to execute the computer-executable instructions to:
    generate, based at least in part on a first chromosome and a second chromosome, a third chromosome, wherein the third chromosome comprises a determinant gene and a conditional gene, wherein a value of the conditional gene is based at least in part on a value of the determinant gene;
    identify a first hidden gene and a second hidden gene corresponding to the conditional gene;
    determine, based at least in part on the value of the determinant gene, that the value of the conditional gene is equal to a value of the first hidden gene;
    determine, based at least in part on the value of the conditional gene an objective value corresponding to an objective model;
    determine, based at least in part on the objective value, that the third chromosome is non-dominated by a fourth chromosome; and
    provide the third chromosome as a solution to a multi-objective optimization problem.

12. The system of claim 11, wherein the at least one processor is further configured to execute the computer-executable instructions to:
    determine, based at least in part on the value of the conditional gene, a constraint value corresponding to an objective model; and
    determine, based at least in part on the constraint value, that the third chromosome is feasible.

13. The system of claim 11, wherein the at least one processor is further configured to execute the computer-executable instructions to:
   determine a second objective value corresponding to the fourth chromosome; and
   compare the first objective value to the second objective value, wherein determining that the third chromosome is non-dominated by the fourth chromosome is based at least in part on the comparing.

14. The system of claim 11, wherein the conditional gene is a first conditional gene, and wherein the at least one processor configured to generate the third chromosome comprises the at least one processor configured to perform a cross-over function between the first chromosome and the second chromosome, wherein the first chromosome has a third hidden gene and a fourth hidden gene corresponding a second conditional gene, the second conditional gene of the first chromosome corresponding to the first conditional gene of the third chromosome.

15. The system of claim 11, wherein the at least one processor configured to generate the third chromosome comprises performing a mutation function, wherein at least one of the first hidden gene and the second hidden gene is mutated.

16. The system of claim 11, wherein the first hidden gene corresponds to a first range of values of the determinant gene, and wherein the second hidden gene corresponds to a second range of values of the determinant gene.

17. The system of claim 11, wherein the first hidden gene has a first allowable range of values and the second hidden gene has a second allowable range of values, wherein the first allowable range and the second allowable range are at least partially non-overlapping.

18. The system of claim 11, wherein the determinant gene is a first determinant gene, and wherein the first determinant gene has a value equal to one of a value of a third hidden gene or a fourth hidden gene based at least in part on a second determinant gene.

19. The system of claim 11, wherein the conditional gene is a first conditional gene, and wherein the third chromosome has a second conditional gene, a third hidden gene corresponding to the second conditional gene, a fourth hidden gene corresponding to the second conditional gene, and a fifth hidden gene corresponding to the second conditional gene, wherein a value of the second conditional gene is based at least in part on a set of rules and a set of at least one determinant genes.

20. The system of claim 19, wherein the objective value is based at least in part on the second conditional gene.

* * * * *